5 Sheets—Sheet 1

T. VAN KANNEL.
GAS-GENERATOR.

No. 183,991. Patented Oct. 31, 1876.

Attest: Warren Smith, C. Van Lumen

Inventor: T. Van Kannel

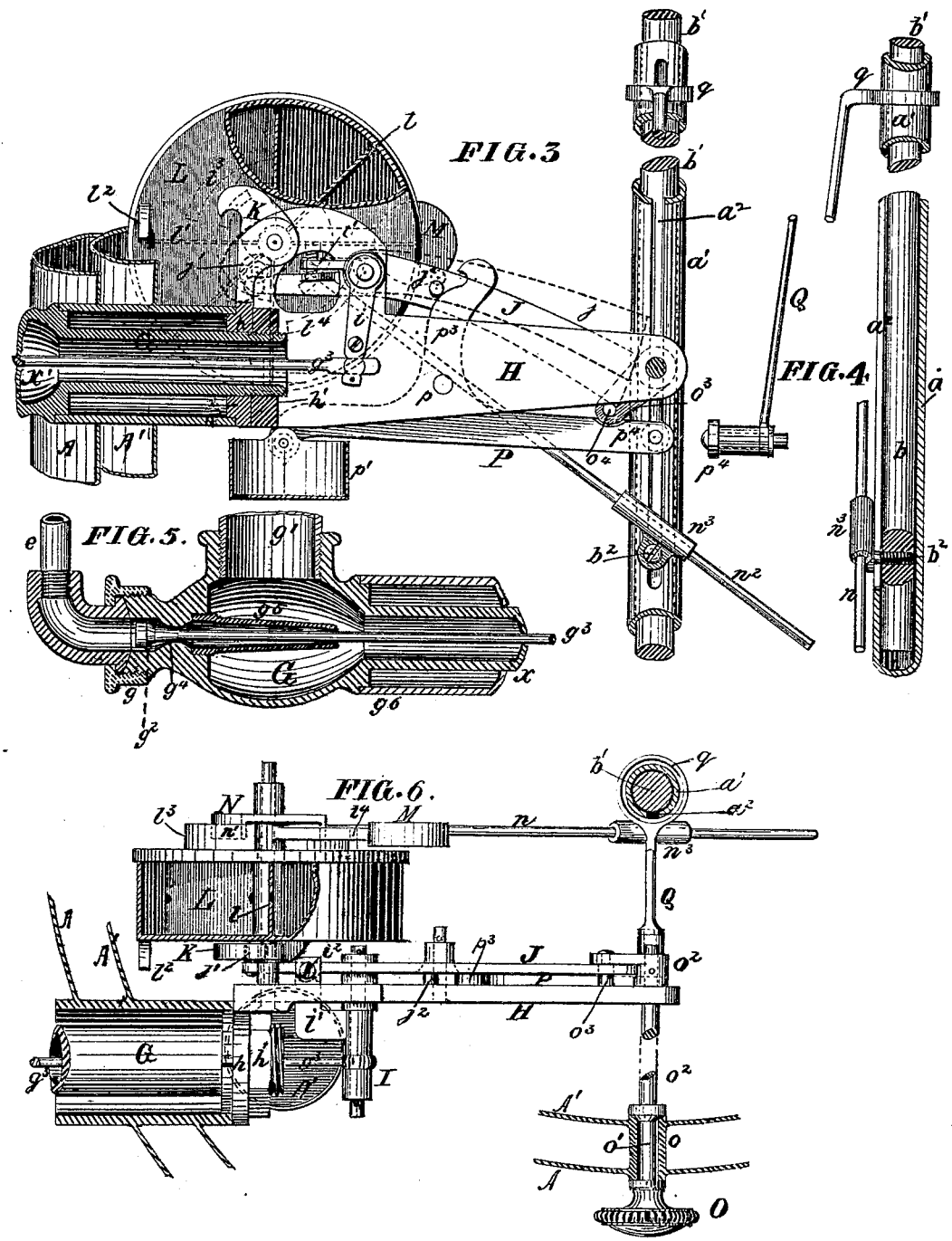

T. VAN KANNEL.
GAS-GENERATOR.

No. 183,991. Patented Oct. 31, 1876.

Attest: Warren Smith, C. Van Lemmen.

Inventor: T. Van Kannel

5 Sheets—Sheet 4.
T. VAN KANNEL.
GAS-GENERATOR.
No. 183,991. Patented Oct. 31, 1876.
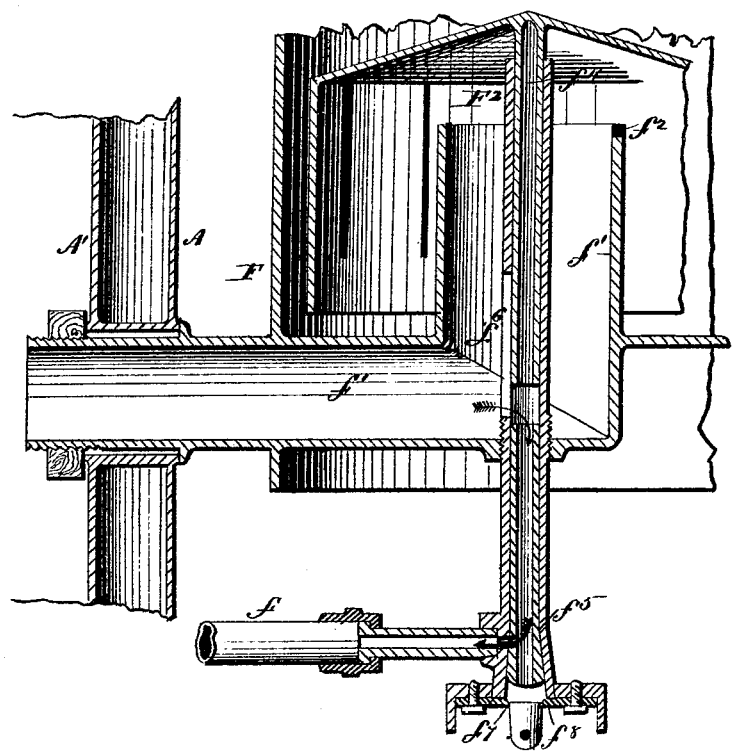
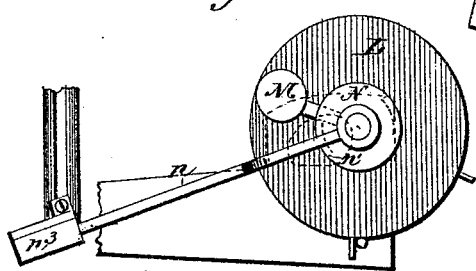
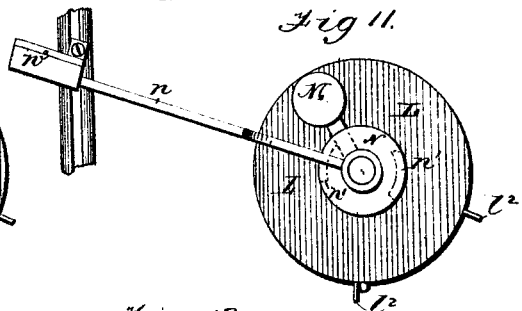
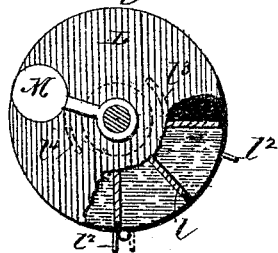
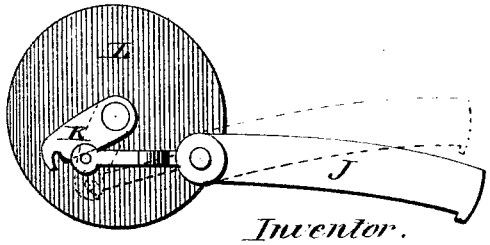
Witnesses:
Harry C. Clark
Mamie Stallings
Inventor.
T. Van Kannel
by Geo. Beadle & Co.
Attys T. VAN KANNEL.
GAS-GENERATOR.
No. 183,991. Patented Oct. 31, 1876.
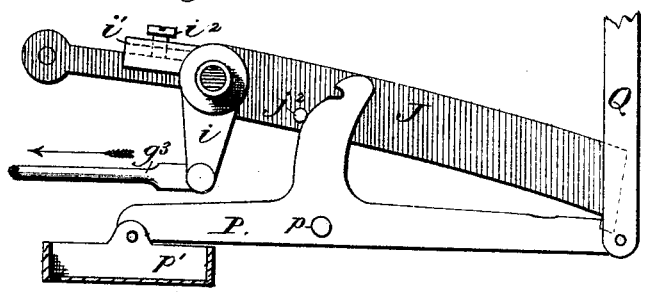
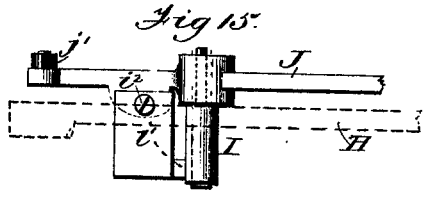
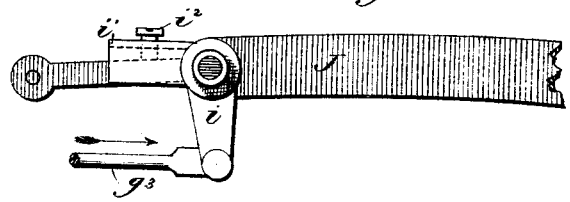
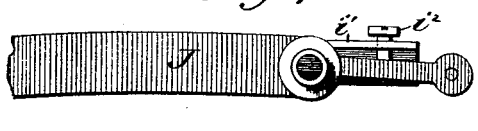
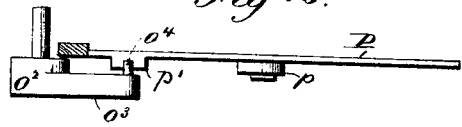
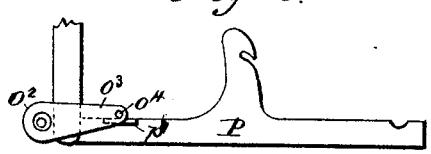
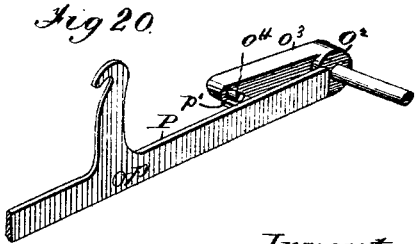
Witnesses;
Harry C Clark
Mamie Stallings
Inventor.
T. Van Kannel.
by H.W. Beadle & Co.
Attys.

UNITED STATES PATENT OFFICE.

THEOPHILUS VAN KANNEL, OF CINCINNATI, OHIO.

IMPROVEMENT IN GAS-GENERATORS.

Specification forming part of Letters Patent No. 183,991, dated October 31, 1876; application filed August 21, 1876.

*To all whom it may concern:*

Be it known that I, T. VAN KANNEL, of Cincinnati, county of Hamilton and State of Ohio, have invented a new and Improved Gas-Generator; and I do hereby declare that the following is a full, clear, and exact description thereof, reference being had to the annexed drawings, making a part of this specification.

This invention relates to that class of gas-machines in which the vapor of gasoline or other suitable hydrocarbon, obtained by heating the same in a retort, is mixed with atmospheric air to form an illuminating-gas; and it consists mainly, first, in the employment of peculiar regulator adapted to act by the flow of the gas-current only, to deliver to the heating-burner gas proportioned to the amount used for illuminating purposes; second, in the special construction and arrangement of the heating coil in which the gasoline is vaporized; third, in the employment of certain special valve mechanism for shutting off and letting on the flow of gas without shock; fourth, in the employment of certain special safety mechanism for closing the valve when gasoline enters the tank. It consists, further, in certain other features and certain specific details of construction, all of which, in connection with the foregoing, will be fully described hereinafter.

Figure 1:
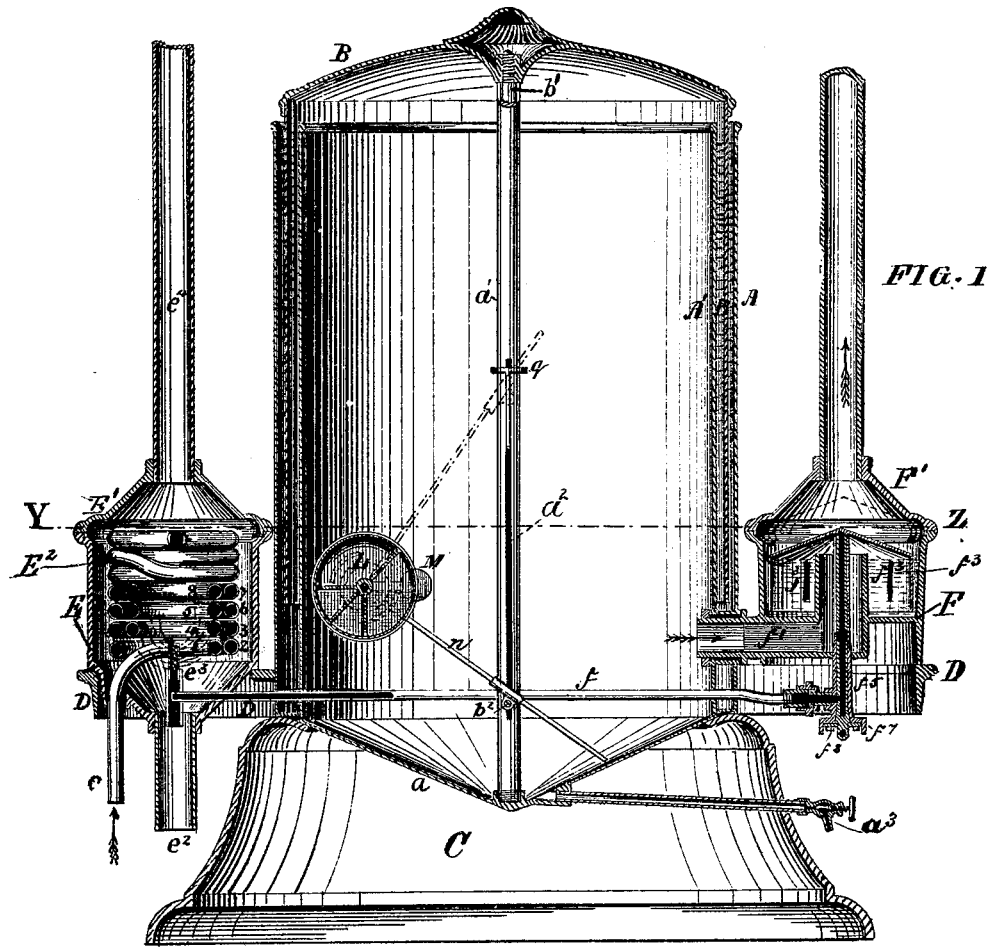
Figure 2:
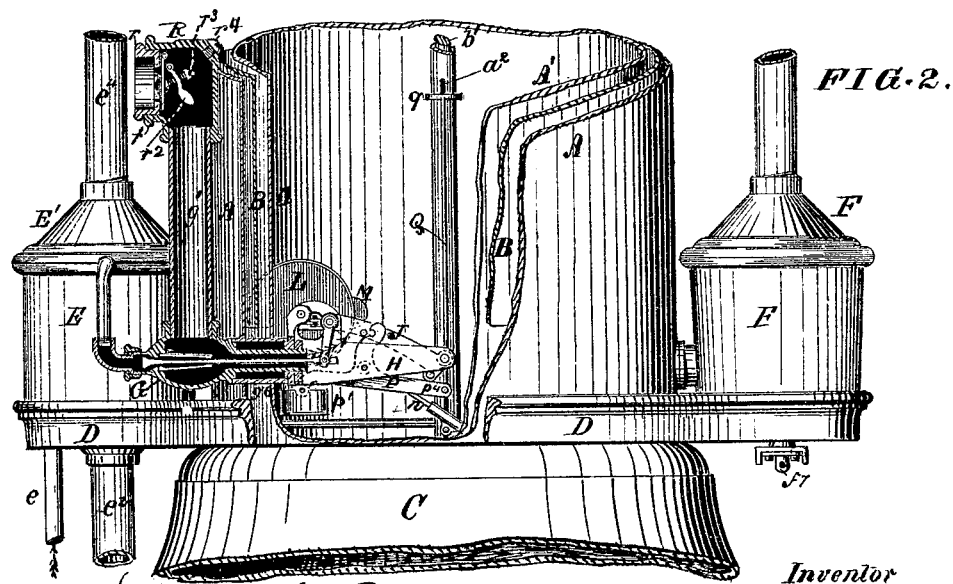
Figure 7:
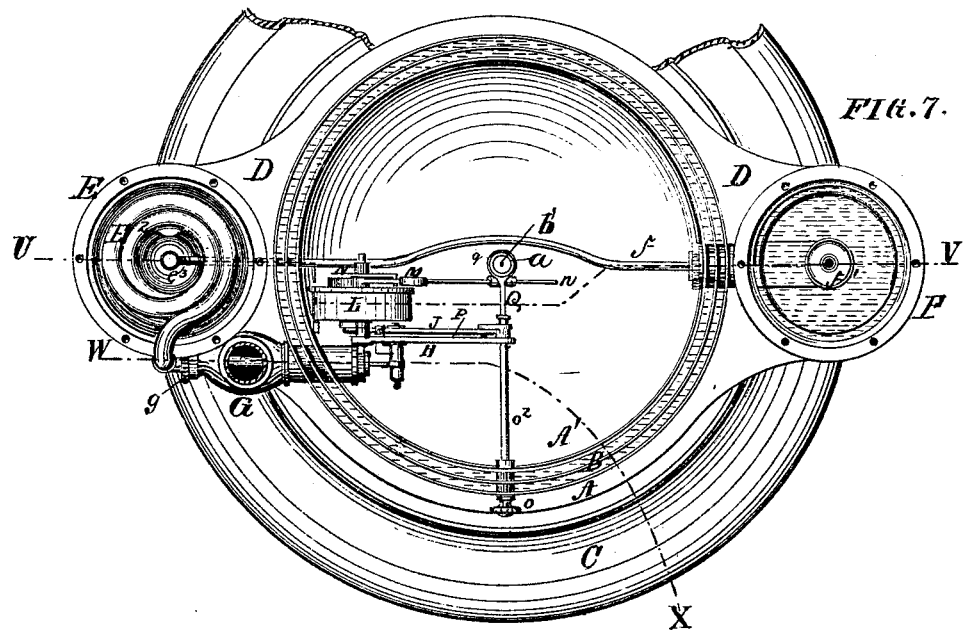
Figure 8:
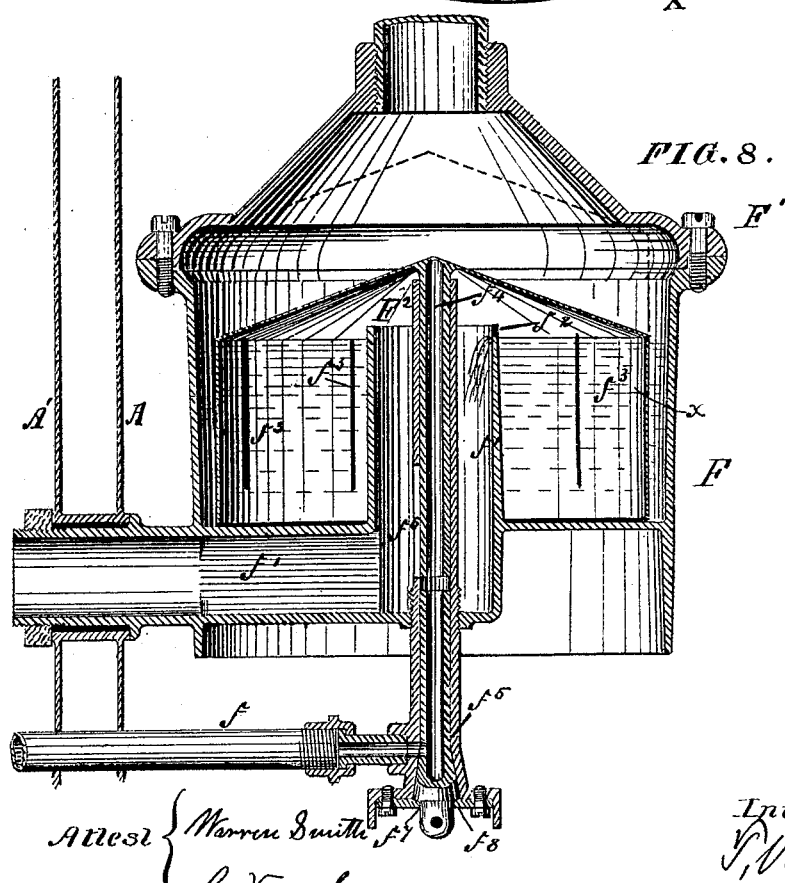

In the drawings, Figure 1 is a vertical longitudinal section, taken in the line U V, Fig. 7. Fig. 2 is a sectional front elevation, taken on the line W X, Fig. 7; Fig. 3, an enlarged side elevation, partially in section, of the mechanism for actuating the inhaling-valve; Fig. 4, an enlarged elevation of the auxiliary safety mechanism adapted to act when the cam $k$ fails to operate; Fig. 5, an enlarged sectional elevation of the inhaling-valve; Fig. 6, a plan view of the mechanism shown in Fig. 3; Fig. 7, a plan view, taken on the line Y Z of Fig. 1; Fig. 8, an enlarged vertical sectional elevation of the regulator, the shell F² being represented in its downward position; Fig. 9, a similar view with the shell slightly raised; Figs. 10, 11, 12, and 13, various views of the trip mechanism for actuating the primary mechanism controlling the valve; Figs. 14, 15, 16, 17, 18, 19, and 20, views of various parts of the valve-actuating mechanism detached.

To enable others skilled in the art to make and use my invention, I will now proceed to describe fully its construction and manner of operation.

For convenience and clearness of description the following divisions of the subject-matter will be made:

First, the gas-tank and the parts directly connected thereto; second, the retort; third, the inhaling-valve and automatic air-check valve employed in connection therewith; fourth, the primary mechanism for controlling the movements of the inhaling-valve; fifth, the auxiliary intermediate mechanism for communicating the movements of the gasometer to the primary mechanism controlling the movements of the valve; sixth, the auxiliary safety mechanism for closing the valve when gasoline enters the tank; seventh, the auxiliary mechanism for closing the valve when the intermediate mechanism actuated by the gasometer fails to act; eighth, the hand mechanism for actuating the valve; ninth, the regulator for controlling the supply of gas to the illuminating-burners; and, tenth, the regulator for controlling the supply of gas to the heating-burner.

First, the gas-tank and the parts directly connected thereto: A, Fig. 1, represents the outer cylindrical wall of the gas-tank, and A, the inner wall concentric thereto, the two being united at their lower edges by a common base-piece, which is itself supported by the annular flange which forms the top portion of the foundation-casting C, as shown. An intervening space, it will be observed, is left between the walls, for holding the water or other fluid employed to seal the gasometer. $a$ represents the bottom of the gas-tank, which is made conical in form, in order that the gasoline or other liquid accumulating therein may flow to the discharge-opening at the center, and also for the purpose of more perfectly supporting the central tube attached thereto, which guides the gasometer-tube in its movements. $a^1$ represents the guide-tube, which is strongly secured at its base in any suitable manner, and is provided with a longitudinal slot, $a^2$, as shown. $a^3$ represents a discharge-pipe controlled by a suitable cock, by means of which the accumulations in the tank may be drawn off when desired.

B represents the gasometer, constructed generally in the usual well-known manner, the sides of which are adapted to move vertically in the space between the walls of the tank, as shown. $b^1$ represents a stem or tube rigidly attached at its upper end to the apex of the gasometer, which is adapted to move vertically within the tube $a^1$ for the purpose of guiding the gasometer in its movements. This stem or tube is, preferably, secured to the gasometer by a nut permanently fastened to the apex of the latter, as shown in Fig. 1, the parts being united by screwing the gasometer to place. D D represent semicircular rings rigidly secured to the base C in any proper manner, which are adapted to inclose the base of the tank, and hold it properly in place, the same being provided also, on opposite sides, with circular extensions, adapted to hold the retort and regulator hereinafter referred to.

The general operation of these parts will be readily understood. The base-piece C furnishes a proper support for the superstructure, and the rings D D unite the parts together. The gasometer is adapted to rise and fall in the usual well-known manner, and is guided in its movements by the tube $a^2$ and stem $b^1$. The gasoline accumulating in the tank necessarily flows to the center, and is drawn off through the pipe $a^3$.

Second, the retort: E represents a cylindrical shell or housing constructed, generally, in any proper manner, and of any suitable material and size, which is supported in position by one of the circular extensions of the rings D, as shown. $e^2$ represents a pipe secured to the lower end of the shell, by means of which air is supplied to the burner. $e^3$ represents the burner, of any suitable construction, which is held in its proper position in the retort by any suitable means, gas being supplied to it through the pipe $f$ from the regulator hereinafter referred to. $E^1$ represents a removable cap properly secured in place by machine-screws, as shown in Fig. 7, which is provided at its apex with a pipe, $e^4$, adapted to conduct away the smoke and gas to any proper point. $e$ represents a pipe, one end of which communicates with a tank or other proper receptacle containing gasoline, and the other end of which discharges into an inhaling-valve, G, hereinafter referred to, an intermediate portion, $E^2$, being formed into a coil of special arrangement within the retort, as will now be described. This pipe, as it enters the retort from below, is first wound horizontally at 1 to form the inner ring of the lower tier, and then again at 2 to form the outer ring of the same tier, both rings, it will be understood, being in the same horizontal plane. If a triple or quadruple coil is desired, the first tier is formed by a continued winding from within outward in the same horizontal plane. To form the second tier, the pipe is carried upward a distance equal to its diameter, and then wound from without inward in the same horizontal plane until the desired number of rings has been made.

The operation of the retort will be readily understood. The gasoline is admitted from the tank or other source of supply to the coil $E^2$ under slight pressure. Being exposed to heat in the coil, vapor is formed, which is conducted to the inhaling-valve hereinafter referred to. The construction of the coil, as before described, is such that there is no dip from the horizontal in its upward windings, so that no traps are formed, and, consequently, no opportunity is afforded for the liquid gasoline to be caught by the vapor and carried with it into the gas-tank, but, on the contrary, the tendency is to constantly force, by the pressure of the vapor, the liquid gasoline back toward the tank, while the vapor itself passes on to the valve in a hot dry state. Air is freely supplied to the burner through the pipe $e^2$, and the gas and smoke are conveyed away through the pipe $e^4$. The construction of the retort is such, also, that it may be readily taken apart and put together when necessity requires.

Third, the inhaling-valve, and automatic air-check valve employed in connection therewith: G, Figs. 2, 5, and 7, represent a hollow bulb, united at one end to the discharge end of pipe $e$ by a ground union, $g$, as shown, and opening at the other, by means of an extended tubular portion, into the gas-tank, as shown in Fig. 2. $g^1$ represents a pipe projecting upward from the bulb, by means of which air is admitted to mix with the pure gas, to properly dilute the same. $g^5$ represents a nipple projecting from one of the walls of the bulb, as shown. $g^6$ represents a sleeve extending through the walls of the tank, and firmly secured thereto, by means of which the bulb is securely held in place. $g^2$ represents the valve proper, which is provided with a tapering portion, $g^4$, and an extended stem or rod, $g^3$, as shown. $r$, Fig. 2, represents an elbow attached to the top of pipe $g^1$, through which air is delivered to the inhaling-valve. $r$ represents a reducer having a proper valve-seat or bearing-face, as shown. $r^1$ represents a valve accurately fitted thereto, which is also hinged to the same at its top, as shown. $r^2$ represents a hinged weight attached to the valve $r^1$, and $r^3$ a screw by means of which the position of this weight relative to a vertical line may be adjusted as desired. $r^4$ represents a plug inserted in the elbow opposite the screw, which may be removed, when desired, for the purpose of leaving an opening for the insertion of a screw-driver, to turn the screw to adjust the weight.

The operation of the inhaling and air-check valves will be readily understood. The first is opened and closed, at the proper times, by mechanism hereinafter referred to. When opened, gas from the retort flows through it, and, by the pressure or exhaust resulting from its flow, draws in air through the pipe $g^1$ and check-valve $r^1$, and, mixing with the same, passes into the tank in a proper condition for illuminating purposes. The amount of air drawn in through the pipe depends, first, upon the freedom with which valve $r^1$ opens, this depending, of course, upon the position of the adjustable weight, which may be regulated at will, and, second, upon the force of the gas-current entering from the retort—a stronger current, of course, creating more blast, and drawing in a greater amount of air, than a weaker one.

It will be understood, of course, that the weight will require less power to overcome its resistance when it hangs in a vertical plane than when it is held at right angles thereto, and that its resistance necessarily will be proportioned to the angle assumed relatively to a vertical line.

The air-check valve, when properly regulated, opens automatically to admit just the proper amount of air, no matter how much the gas-current may vary in force—a stronger current, of course, as before stated, drawing in more than a weak one.

The valve proper, it will be observed, is provided with two independent portions, $g^2$ $g^4$, each of which serves a specific purpose. The part $g^2$ is, in fact, a simple conical valve, with the usual obtuse-angled bearing-face; and its purpose is to cut off the flow of gas when closed against its seat. The part $g^4$ is also conical in form, but is made long and tapering, in order that it may gradually enlarge or diminish the size of the passage-way for the gas, when the valve is actuated. As its function is not to cut off the flow, but to graduate the flow, it does not bear tightly against its seat, and hence that tendency to stick which is incidental to an acute-angled cone is avoided.

Fourth, the primary mechanism for controlling the movements of the inhaling-valve: H, Figs. 6 and 7, represents a frame adapted to support the main portion of the valve-actuating mechanism, which is provided with an angular extension, $h$, Fig. 6, having a proper socket adapted to fit over the sleeve $g^6$, to which it is securely attached by means of a nut, $h'$, screwed onto the end of the sleeve for the purpose of holding it in place. I, Figs. 6, 7, 14, and 15, represents a lever pivoted, by means of an elongated socket, to a stud projecting from the frame, one arm, $i$, of which projects in a downward direction, and is secured, near its lower end, to the stem $g^3$ of the valve $g^2$. The other arm $i^1$, Figs. 6 and 15, projects, at right angles to the first, in a horizontal plane, and is provided with a lateral extension, projecting through a suitable opening in the frame H, having a set-screw, $i^2$, as shown. The tendency of this lever, in consequence of the weight of its upper arm, is to close the valve $g^2$; and hence other mechanism must be employed to open it, and this will now be described.

J, Figs. 3, 6, and 14, represents a lever pivoted to a stud projecting from the frame H, one end of which, by reason of its greater length, or from other cause, is made heavier than the other. The shorter or lighter end of this lever extends directly, or by means of a projecting part, beneath the set-screw $i^2$, as shown in Fig. 15, and hence, when this lever is free, its long arm being depressed by its excess of weight, as shown in Figs. 3 and 14, its short arm is consequently moved to raise the arm $i^1$ of lever I, and consequently open the valve $g^2$. $j^1$, Fig. 15, represents a friction-roller supported by a pin projecting from the rear end of lever J, the purpose of which will be hereinafter explained.

The operation of this mechanism will be readily understood. The lever I, when free to move, acts to draw forward the stem $g^3$ of the valve and close the same, (its position being shown in Fig. 16,) this result being produced by the weight of its unbalanced arm $i^1$, as will be readily understood from an inspection of the drawing. The lever J, when its long arm is depressed, as shown in Figs. 3 and 14, acts, by means of that portion which extends beneath the set-screw of the arm $i^1$ of the lever I, to raise the latter, and thus, by means of it, throw back the valve-stem to open the valve. By means of the set-screw $i^1$ the lever I may be adjusted so that it may be properly actuated by lever J to accurately close the valve. These levers constitute what I term the primary mechanism for moving the valve, certain auxiliary mechanism being employed to actuate them for various purposes, as will be described under proper heads.

Fifth, the auxiliary intermediate mechanism for communicating the movements of the gasometer to the primary mechanism controlling the movement of the main valve: L, Figs. 3, 6, and 12, represents a hollow cylinder adapted to turn upon a central supporting-shaft, which is provided with a series of radial partitions, $l$ $l$, having at their circumferential ends a small opening, as shown. $l^2$ $l^2$, Figs. 3, 6, and 12, represent stops by means of which and a proper projection upon the frame H the movement of the cylinder is limited to an arc of ninety degrees. This cylinder is partly filled with water and hermetically sealed. K, Figs. 3, 6, and 13, represents a scroll-cam, which is permanently attached to the cylinder L, and consequently moves with it. This cylinder and its cam K are operated by the following mechanism. N, Figs. 6 and 11, represents a disk adapted to turn upon the shaft supporting the cylinder, which is provided with two projections, $n^1$, and a stem or rod, $n$, as shown. $n^3$, Fig. 3, represents a sleeve or cylinder adapted to inclose the rod $n$, which is secured, by means of an ear and set-screw, to the gasometer-stem $b^1$, as shown. M, Figs. 6 and 11, represents a drop-weight hung on the shaft of cylinder L, which moves, when actuated by the disk, between the projections $l^3$ $l^4$, Figs. 3 and 12, upon the cylinder L, as will be hereafter described.

The operation of this mechanism is substantially as follows: When gas is received through the inhaling-valve it first fills, of course, the tank, and then, as it accumulates, lifts the gasometer in the usual well-known manner. As the gasometer rises it carries with it, by means of its stem $b^1$, the rod $n$, secured thereto by means of the sleeve $n^3$ and pivot $b^2$, and this rod lifts, by means of the projection $n^1$, the weight M. When the proper limit has been reached, and it is desirable that the supply of gas should be cut off, the weight M, lifted by the projection $n^1$ of the rod $n$, is caused to pass beyond a vertical line, and hence, being unsupported, it falls upon the other side. In falling it comes in contact with the projection $l^3$ or $l^4$, as the case may be, upon the cylinder, and carries it with it in its movement until both are arrested by the contact of the stop $l^2$ of the cylinder with the stop on the frame. The movement of the cylinder, however, is not rapid, because the effect of the weight is counterbalanced by the weight of the fluid within, and hence it follows that only as the water escapes into the lower chambers through the small openings at the ends of the partitions can the cylinder move. It follows, then, necessarily, that the cam $k$, which is rigidly attached to the cylinder, as shown in Fig. 13, and moves with it, acts gradually upon the pin $j^1$, and hence the short end of lever J is raised very slowly, and the lever I caused to move with a corresponding speed to close the valve. The valve being closed, the gasometer will necessarily descend as the gas is consumed. When the proper limit has been reached in its descent, the rod $n$, by means of the other projection on disk N, will raise the weight and cause it to fall upon the opposite side, in consequence of which the cylinder will be moved in the opposite direction, the cam $k$ being gradually removed from the lever J, so that the latter is free to act through lever I to open the valve. The valve, then, it will be understood, is opened and closed to control the flow of gas from the retort according to the movements of the gasometer, the supply being gradually shut off when the latter is full, and gradually opened when the supply is nearly exhausted.

Sixth, the auxiliary safety mechanism for closing the valve when gasoline enters the tank: If, from any cause, the heating-burner under the retort should become accidentally extinguished, liquid gasoline might enter the tank and overflow the same, thus endangering the machine and its surroundings. To provide for this contingency the following mechanism is employed. P, Figs. 3 and 14, represents a lever pivoted at $p$, which is provided at a proper point with the vessel $p^1$, located below the discharge end of the inhaling-valve, so that gasoline flowing therefrom will enter the same. $p^3$ represents a vertical arm, provided at its upper end with a cam-surface, adapted, when the lever is tilted on the pivot $p$, by the accumulation of gasoline in the vessel $p^1$, to press against the pin $j^2$ of lever J, and raise the long arm of the latter. The raising of this lever closes the valve in the manner before described. The vessel $p^1$ is provided with a small opening in its bottom, through which its contents are gradually discharged into the tank.

The operation will be readily understood. When gasoline enters the tank from any cause it falls into the vessel $p^1$, and, depressing the same by its weight, tilts the lever on its pivot, and consequently raises by its cam the lever J, and thus causes the valve to close. The closing of the valve by shutting off the gas will eventually extinguish the lights, and thus give notice that the machine requires attention. When the burner is again lighted and the valve opened, the gasometer will fill in the usual manner. The gasoline in vessel $p^1$ will be gradually discharged through the small opening in its bottom, and, accumulating in the central depression of the tank, it may be drawn off through the pipe $a^3$. The discharge of the gasoline from the vessel $p^1$ permits the lever P to assume again its normal position.

Seventh, the auxiliary safety mechanism for closing the valve when the intermediate mechanism actuated by the gasometer fails to act: In case the cam K or its connections should fail to act, the following auxiliary mechanism is employed to close the valve. Q, Figs. 2 and 4, represents a simple connecting-rod, united at its lower end to the long arm $p^4$ of the lever P, Fig. 14, and at its upper end by means of a ring or sleeve, $q$, Figs. 3 and 4, to the tube $a^2$. This sleeve, it will be observed, is located just above the usual stopping-place or tilting-point of the screw $b^2$, so that under ordinary circumstances no effect will be produced by its employment.

The operation is as follows: If, from any cause, the cam K fails to close the valve at the usual point, the further movement of the gasometer brings the sleeve $n^3$ in contact with the ring $q$, and, consequently, by means of the intermediate connecting-rod, it acts to raise the lever P, which actuates lever J to close the valve. By this action, however, the lever J has been raised by lever P out of its usual position, and hence, when the gasometer descends, it does not act to open the valve, and, the supply of gas being cut off, the lights will be extinguished, and this will give notice that the apparatus needs attention. When the defect has been remedied, the mechanism described under the following head is employed to return lever J to its normal position.

Eighth, the hand-mechanism for actuating the valve: O, Fig. 6, represents a knob provided with a gas-tight key, $o^1$, extending through a fixed sleeve, $o$, a stem, $o^2$, extending through the frame H, and a crank, $o^3$, having a pin, $o^4$, lying beneath the lever J at a point below the limit of its movement in a downward direction. $p^2$, Figs. 18, 19, and 20, represents a projection upon one end of lever P, which lies beneath the pin $o^4$, as shown.

The operation is as follows: By moving the knob in the proper direction the crank-arm will come in contact with the projection upon lever P, and, depressing the same, will release lever J from the action of cam $p^3$, and permit it to fall to open the valve. By moving the knob in the opposite direction the lever J may be raised at any time to close the valve. If desired, the crank $o^3$ may act directly against lever P, as shown in Fig. 3, instead of against a projecting portion, as shown in Figs. 18, 19, and 20.

Ninth, the regulator for controlling the supply of gas to the illuminating-burners: F, Figs. 1, 8, and 9, represents a housing or shell supported by a circular extension of the ring D, as shown in Fig. 7. $F^1$ represents a removable cap or cover, secured in place by machine-screws, as shown, which is provided at its apex with a pipe for conveying away the gas to any desired point. $f^1$ represents the pipe by means of which the gas is received from the tank. This pipe enters near the bottom of the housing, and is bent or otherwise formed so that its discharge end stands in a vertical position, as shown. Water is represented at $x$ in the drawing, Fig. 8, which is limited in height by the overflow-point $f^2$, so that an excess in quantity cannot occur. $F^2$ represents a metallic shell or cup, having a series of vertical slots, $f^3$, extending, when the cup is down, from the water-line downward, as shown, which slots contain, in the aggregate, an area equal to that adapted to supply gas for the full number of burners that the machine is rated to run.

The operation is substantially as follows: When all the cocks of the burners are shut off, the pipes being full of gas, the pressure is equal, of course, upon each side of the regulator, and hence the cap is held by the force of gravity in its downward position. When, however, one or more burners are lighted the equality of pressure is disturbed, the gas flowing, of course, from the pipe between the regulator and burners. In consequence of this an excess of pressure exists within the shell or cap, and it, consequently, is lifted thereby until the pressure is again equalized, or nearly so, this being just enough, of course, to supply the burners. It follows then that the cap will rise when the burners are lighted and expose an area of opening, which will be proportioned to the number in use.

Tenth, the regulator for controlling the supply of gas to the heating-burner: $f^4$, Figs. 8 and 9, represents a vertical guiding-stem fitting snugly the interior of a fixed brass tube, $f^5$, projecting downward below the regulator, and terminating in the shell of a gas-key, as shown. $f^6$ represents a slot upon one side, which opens into the gas-pipe $f^1$. $f^7$ represents the gas-key, and $f^8$ a spring for keeping it in place. $f$ represents the pipe by means of which gas is conveyed to the heating-burner.

The operation is substantially as follows: As the regulator rises to supply the burner its guide-stem rises with it, and makes an opening from the slot $f^6$ into the interior of the tube, as shown in Fig. 9, so that a free passage is made for the gas, the opening of the slot $f^6$ corresponding, of course, in area with the height the cap is lifted, and consequently with the number of burners in operation.

The supply of gas may be shut off, if desired, by turning the gas-key by hand.

The general operation of my machine, as a whole, will be readily understood from the foregoing description: The gasoline is supplied from the tank to the retort under a slight pressure, say, from three to seven pounds per square inch. Being subjected to heat vapor is formed, which passes into the inhaling-valve, where air is mixed with it in proper quantities. The new mixture is then delivered into the gas-tank, where it is stored for use. The supply of gas is controlled by the movements of the gasometer, it being cut off and let on, however, gradually, so that no shock is given to the lights. From the tank the gas passes to the regulator, from which it is delivered to the illuminating and to the heating burners in proportionate amounts.

Some of the advantages of the described construction are as follows: By means of the construction and relative arrangement of the parts compactness of form is obtained, and a minimum amount of space is occupied.

The parts, too, are relatively so arranged that strength is obtained in parts subjected to strain.

By employing a conical bottom to support the central guide-tube the latter is more perfectly held than would be possible with a flat bottom, the conical bottom having, of course, no tendency to spring in a vertical movement or to permit lateral movement. The employment of the conical bottom is advantageous, because by means of it gasoline and other liquid accumulations may be entirely drawn off without permitting the escape of gas—a result impossible if a flat bottom is employed.

By providing the gasometer with a fixed nut it is possible to unite it to the stem $b'$ without a joint or opening through which gas can escape. Ready means also is afforded for removing and detaching the gasometer.

The peculiar arrangement of the coil is specially advantageous, because the liquid gasoline and vapor are positively separated from each other, the pipe being without traps to retain the gasoline, and consequently the latter cannot be carried over into the tank to injuriously affect the quality of the gas contained therein. Neither can the gas pass backward into the tank, because there is no ascent from the horizontal in points exposed to the action of heat. When the inhaling-valve $g^2$ is closed the flow in the pipe ceases, of course, and the gas is forced backward to a greater distance than usual; hence, care must be taken that no ascent from the horizontal occurs in the pipe within the limit of the movement of the gas.

By means of the peculiar construction of the coil in the retort the vaporized gasoline is permitted to pass off in a hot dry state, without carrying with it liquid particles.

By means of the construction of the inhaling-valve and its air-pipe the relative amount of air admitted with a given current of gas can be regulated to a nicety, and, when properly regulated, the quantity drawn in will retain at all times the same relative proportion to the amount of gas passing through the valve, no matter to what extent the current may vary in force.

By means of the tapering or conical form given to the valve and its seat the flow of gas is cut off or let on gradually, so that no shock is given to the lights.

By means of the auxiliary mechanism employed in connection with the gasometer to actuate the primary mechanism for controlling the valve, the latter is actuated in accordance with the movements of the gasometer, but in such manner as to gradually cut off or let on the flow, so that no shock is given to the lights.

By the employment of the various safety devices the probabilities of injury from accident are reduced to a minimum.

By locating the trip mechanism and valve within the tank the parts are protected from injury, the construction is simplified, and the tendency to leakage incidental to the use of stuffing-boxes is avoided.

By the employment of the regulator the flame of the heating-burner is increased or diminished according to the amount of gas being consumed.

The machine, as a whole, is exceedingly compact, and all of its working parts are inclosed and protected.

Having thus described my invention, what I claim as new, and desire to secure, is—

1. In combination with the central guide-tube $a^1$, the conical bottom $a$, supporting the same, substantially as described.

2. In combination with the base C, having an upper annular flange inwardly inclined, the tank having the correspondingly-inclined bottom $a$, the construction of the parts being such that the superstructure is strongly held by the base against displacement, substantially as set forth.

3. The combination of the base C and sectional rings D with the tank, as described.

4. A retort formed of a multiple tubular coil, wound alternately from without inward and from within outward without descent from a horizontal plane, substantially as described.

5. In combination with an intermittently-acting valve, a retort composed of a coil of pipe, without dip from the horizontal in any part, directly exposed to the action of heat, the construction being such that no increase of pressure resulting from the closing of the valve can throw gas into the oil-tank, substantially as described.

6. The removable and sectional ring D, provided with circular extensions, as described, for holding the retort and regulator in close proximity to the tank, as described.

7. In combination with the valve $g^2$ for tightly closing the opening, the long tapering portion $g^4$ for gradually enlarging and diminishing the area of the passage-way, substantially as described.

8. In combination with a valve provided with an independent cut-off and graduating portions, substantially as described, mechanism, substantially as described, for giving it a slow movement.

9. The pipe $g^1$, having the elbow R, valve $r^1$, weight $r^2$, and adjusting-screw $r^3$, as described.

10. In combination with a weighted valve having an adjusting-screw, the elbow having the opening and plug $g^4$, as described.

11. In combination with the injector-valve and valve-stem, the crank-lever I, adapted by its weight, when free to act, to close the valve, substantially as described.

12. In combination with the valve $g^2$ and the overbalanced lever I, the lever J, for actuating lever I to open the valve, substantially as described.

13. In combination with the levers I and J, constructed substantially as described, the intermediate set-screw $i^1$, for determining their relative positions and movements, as described.

14. The cylinder L, having the radial partitions and openings, substantially as and for the purpose described.

15. In combination with mechanism, substantially as described, for oscillating the cylinder L, the cylinder and cam K, and the primary mechanism for controlling the valve, substantially as described.

16. In combination with the disk having the projections $n^1$ $n^1$, the drop-weight M, as described.

17. In combination with the rod $n$, the sleeve $n^3$, pivot, and stem $b^1$, as described.

18. In combination with the cylinder L and primary valve-operating mechanism, substantially as described, the disk having projections $n^1$ $n^1$ and the drop-weight, as described.

19. In combination with the cylinder L and primary valve-operating mechanism, substantially as described, and the disk and drop-weight, the rod $n$, actuated by the gasometer, substantially as described.

20. In combination with the lever J for holding open the valve, the lever P and vessel $p^1$, for actuating-lever J to close the valve, substantially as described.

21. A safety mechanism, substantially as described, adapted, by means of the weight of entering fluid, to close a valve, and also, by its construction, to automatically relieve itself from the fluid when the flow of gasoline has been stopped, substantially as described.

22. In combination with a nipple, through which gas is discharged into the tank, a pivoted receiving-vessel, located in the tank below the nipple, adapted, substantially as described, to act by the pressure of entering fluid to close the valve.

23. The combination of the lever P, having cam $p^3$, with the lever J, having pin $j^2$, as described.

24. In combination with lever P, auxiliary mechanism Q $q$, substantially as described, adapted for action when cam K or its connections fail to act, substantially as described.

25. In combination with the primary mechanism for closing the valve and the main trip mechanism for actuating the primary mechanism, auxiliary safety mechanism, actuated by the gasometer-stem, all the parts being inclosed within the tank, substantially as described.

26. In combination with lever P, the auxiliary mechanism O $o^2$ $o^3$, for resetting the lever by hand, substantially as described.

27. In combination with lever J, the auxiliary mechanism O $o^2$ $o^3$, for actuating the lever by hand, substantially as described.

28. In combination with primary mechanism for actuating the valve, the auxiliary mechanism O $o^2$ $o^3$, for actuating the primary mechanism by hand, substantially as described.

29. A regulator actuated by the pressure of the gas current only, adapted, substantially as described, for the double purpose of controlling the supply of gas to the illuminating and heating burners in proportionate amounts, as described.

30. In combination with the shell $F^2$ and stem, having the slit $f^6$, the tubes $f^5$ and $f$, as and for the purpose set forth.

31. A gas-machine having an independent regulator, substantially as described, actuated by the pressure of the gas-current only, and adapted to control the supply of gas to the illuminating and heating burners in proportionate amounts, substantially as described.

32. A gas-machine having the following elements: a retort, a heating-burner, automatic mechanism for controlling the flow of gas from the retort, and a regulator actuated by the pressure of the gas current adapted to supply gas to the heating-burner in proportion to the amount used for illuminating purposes.

33. A gas machine having the following elements: mechanism, substantially as described, for making the gas and delivering it into the gasometer; mechanism, substantially as described, actuated by the gasometer for controlling the flow of gas, and a regulator adapted to control the supply to the illuminating and heating burners independently of the movements of the gasometer, substantially as described.

34. The combination of the following elements: a vertically-moving gasometer having a central inclosed stem, as described; a centrally-fixed guiding-tube; primary mechanism, substantially as described, for actuating the valve-stem; intermediate mechanism, substantially as described, for communicating the movements of the gasometer-stem to the primary mechanism for actuating the valve.

35. The combination of the following elements: a vertically-moving gasometer having a central inclosed stem; a central guiding-tube; intermediate mechanism, substantially as described, for communicating the movements of the gasometer-stem to the primary mechanism for actuating the valve; and auxiliary safety mechanism, substantially as described, actuated by the movement of the gasometer-stem, when the primary mechanism fails to act, substantially as described.

36. In combination with mechanism, substantially as described, for controlling the flow of gas, and an inclosing-tank and gasometer, hand mechanism O $o^2$ $o^3$, extending through the tank for resetting such mechanism, as described.

In testimony that I claim the foregoing as my own I hereto affix my signature in presence of two witnesses.

T. VAN KANNEL.

Witnesses:
A. V. STEWART,
WARREN SMITH.